Sept. 2, 1924.　　　　　　　　　　　　　　　　1,506,762
G. MANIERRE
TRUCK
Filed Feb. 14, 1921　　　　5 Sheets-Sheet 1

Inventor
George Manierre
By Daniel F Brennan
Attorney.

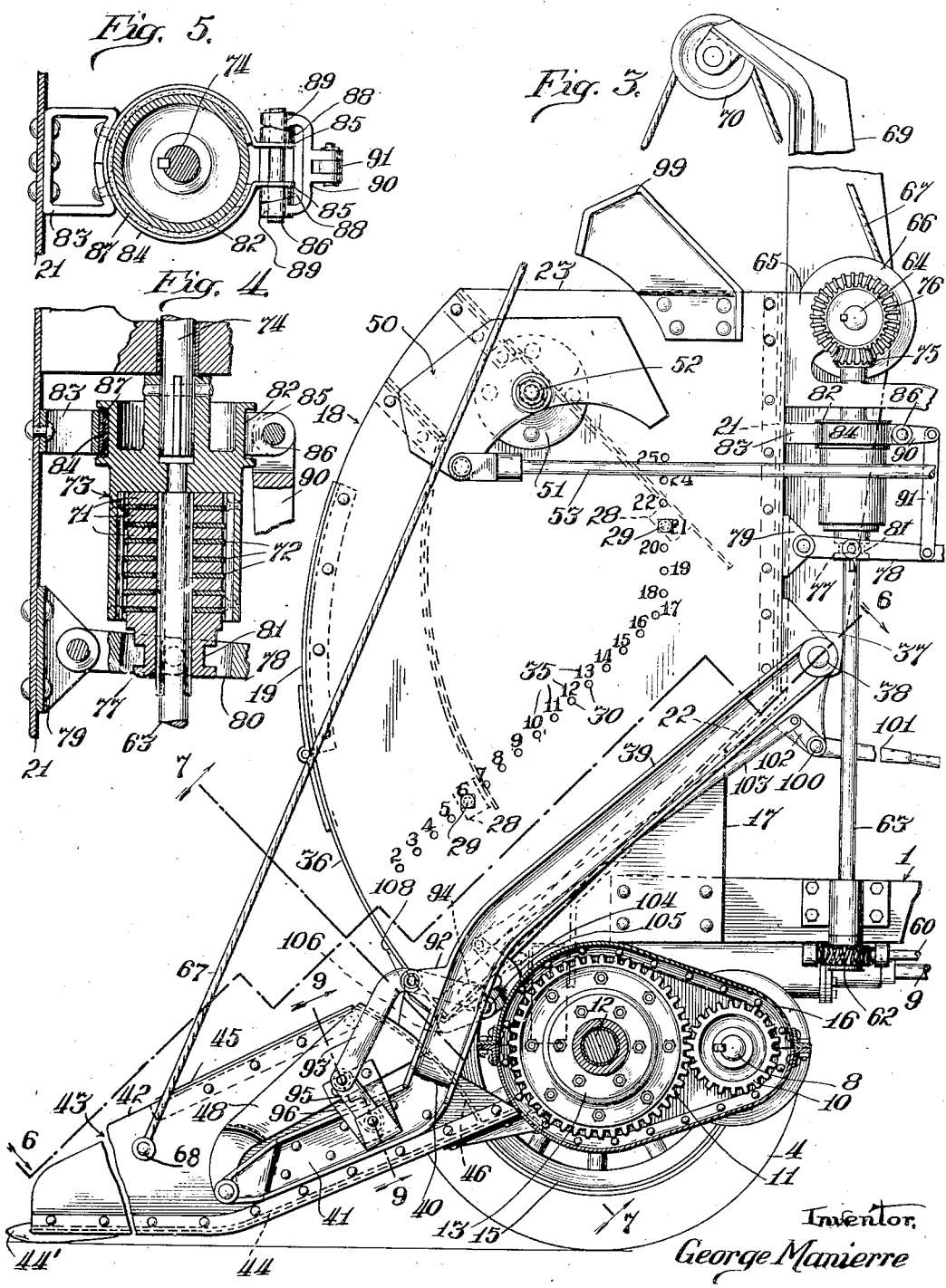

Sept. 2, 1924.

G. MANIERRE

TRUCK

Filed Feb. 14, 1921   5 Sheets-Sheet 3

1,506,762

Inventor.
George Manierre
By Daniel F. Brennan.
Attorney.

Sept. 2, 1924.

G. MANIERRE

TRUCK

Filed Feb. 14, 1921       5 Sheets-Sheet 4

1,506,762

Inventor.
George Manierre
By Daniel J. Brennan.
Attorney

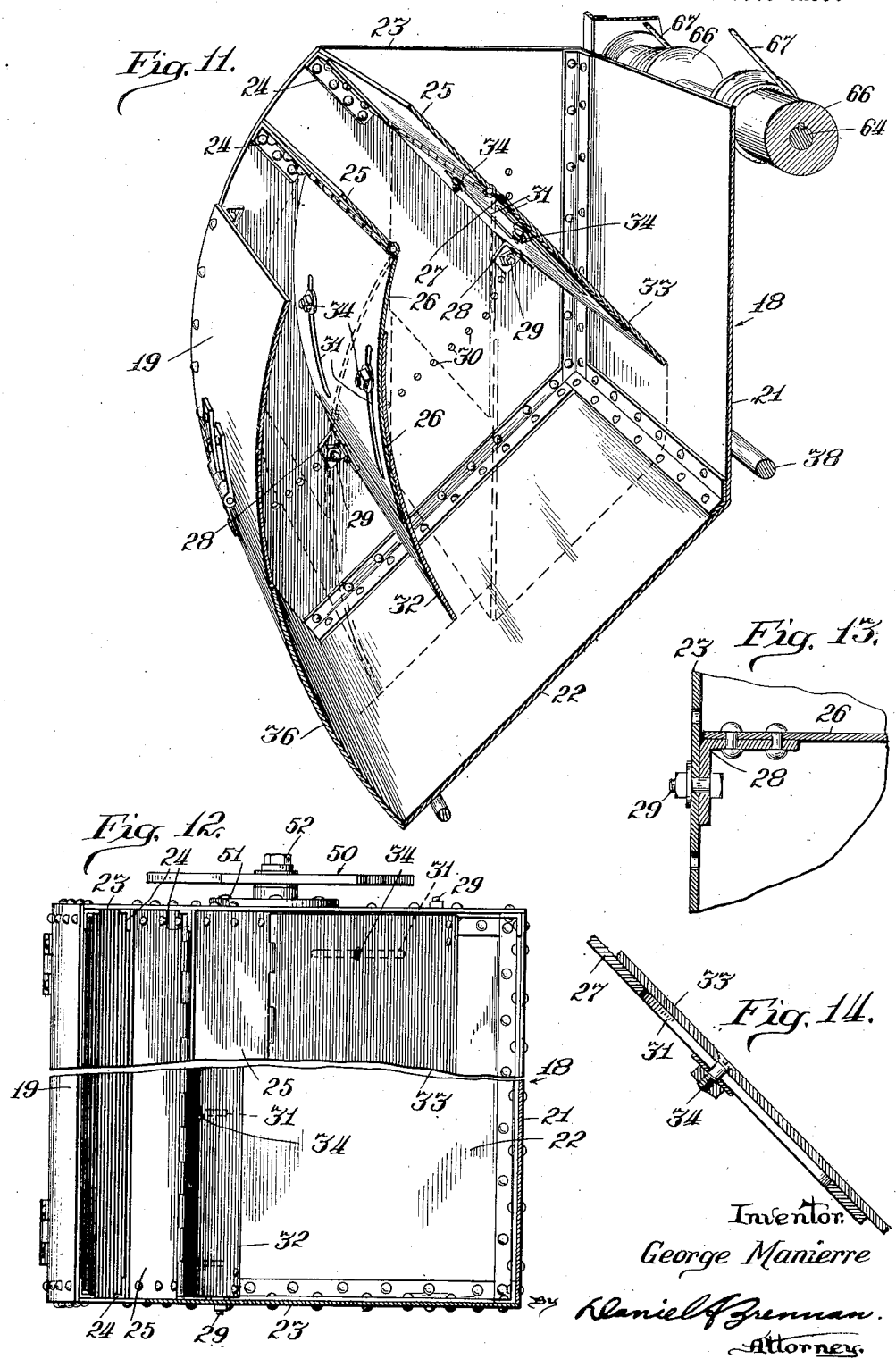

Patented Sept. 2, 1924.

1,506,762

UNITED STATES PATENT OFFICE.

GEORGE MANIERRE, OF MILWAUKEE, WISCONSIN.

TRUCK.

Application filed February 14, 1921. Serial No. 444,868.

*To all whom it may concern:*

Be it known that I, GEORGE MANIERRE, a citizen of the United States, residing at Milwaukee, county of Milwaukee, and State of Wisconsin, have invented a new and useful Improvement in Trucks, of which the following is a specification.

The invention relates to trucks and contemplates to provide in connection with a load carrying box means mounted on the truck and under control of the drive of the truck for conveying the load to the box.

It is an object of the invention to provide means on a machine of this character for transferring bulk material from a heap which may be stored on the ground, into a receptacle in which this material may then also be mixed with other materials and from which the mixture may be transferred to another machine.

The machine is adapted for conveying selectively material, for instance the material necessary to the manufacture of concrete, into several compartments which communicate with one collective space and to transfer this mixture of different materials from the collective space to a conveyor which may take the mixture to a concrete machine.

It is an object of the invention to provide a combination of a selfloading and dumping truck, with an engine for driving it.

It is also an object of the invention, to effect the loading of the truck by forcibly pushing it into the heap of material, so as to automatically fill a scoop or shovel which forms a part of the device.

The invention also contemplates to provide a mechanism for hoisting a scoop or shovel, and to actuate this mechanism by the motor through which the truck is driven.

It is also an object of the invention to provide means in the connection between the drive of the engine and the drive of the hoisting device for rendering the latter inoperative and for applying a brake to the drive of the hoisting device whenever the connection between these two drives is to be interrupted.

The invention also provides means for automatically dumping the contents of the scoop selectively into any one of several compartments and to adjust the size of these compartments to facilitate the proportioning of the mixture of those materials which are to be carried to the collective compartment.

The invention also aims at the provision of means for moving the scoop to discharge position at a selectively determined point of its travel and to combine with these means for tilting the scoop a mechanism whereby the closing plate of the scoop is removed to permit of the discharge of the contents into the compartment.

The invention also has the object of providing a special compartment for the reception of cement, and as cement is rarely stored in form of a heap on the ground, the invention provides means for transferring either the contents of the scoop into the cement compartment or for permitting the transfer of the cement into the same compartment from a suitable platform.

It is also an object of the invention to provide mechanism which can be controlled from the driver's seat, for opening a gate of the collective receptacle into which the various classes of material have been dumped, and to provide means in connection with the scoop for firmly closing the gate of the collective receptacle whenever the scoop returns into a position in which it is suitable for receiving another charge.

Fig. 3 is an enlarged side elevation and partly section of the main mechanism of the machine.

Fig. 4 is a sectional view through a clutch and brake mechanism.

Fig. 5 is a horizontal sectional view through the brake device.

Fig. 11 is a perspective view of the interior of the truck box,

Fig. 12 is a top plan view of the same and the adjusting cam.

Fig. 13 is a detail sectional view of the means for adjusting the diaphragms in the interior of the box.

Fig. 14 is another sectional view for showing the adjusting means of a partition wall.

Figure 1:
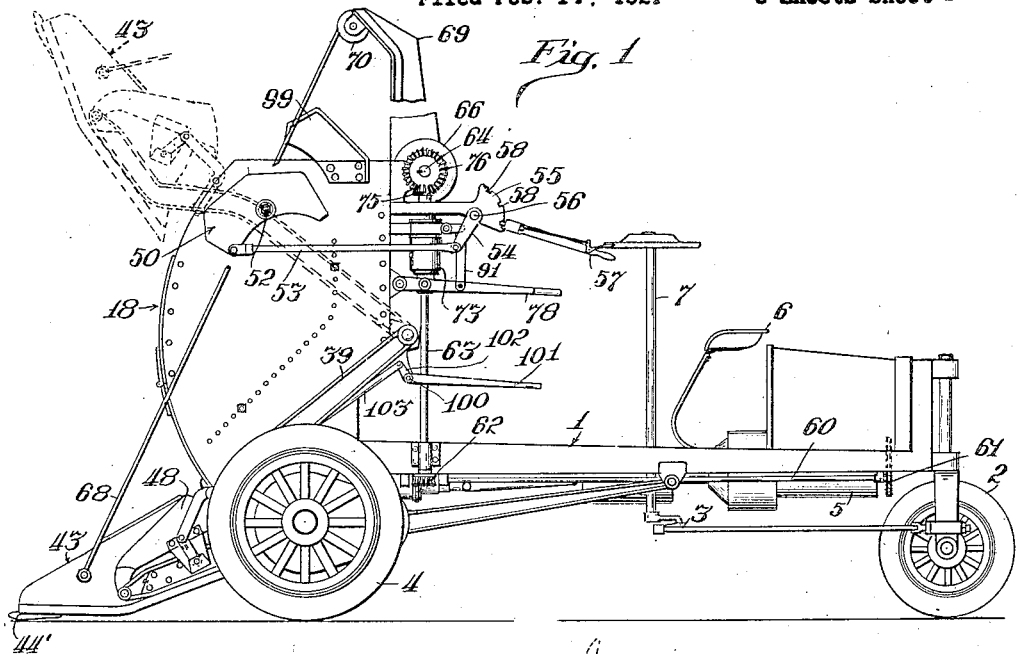
Fig. 1 is a side elevation of the complete machine showing the shovel or scoop in charging position.

As will be seen from Fig. 1 the truck comprises a frame or chassis 1, a steering wheel 2 which may be controlled by the steering device indicated in a general way at 3, and drive wheels 4. The prime mover for the truck may be formed by an internal combustion motor 5 or the like, which is not shown in detail, and which is located under a hood, contrary to the ordinary construction of trucks the operator's seat 6 is disposed here between the steering post 7 and the engine 5, and is disposed so as to enable the operator to observe the movements of the scoop or shovel mechanism which is located adjacent the drive wheels.

Figure 8:
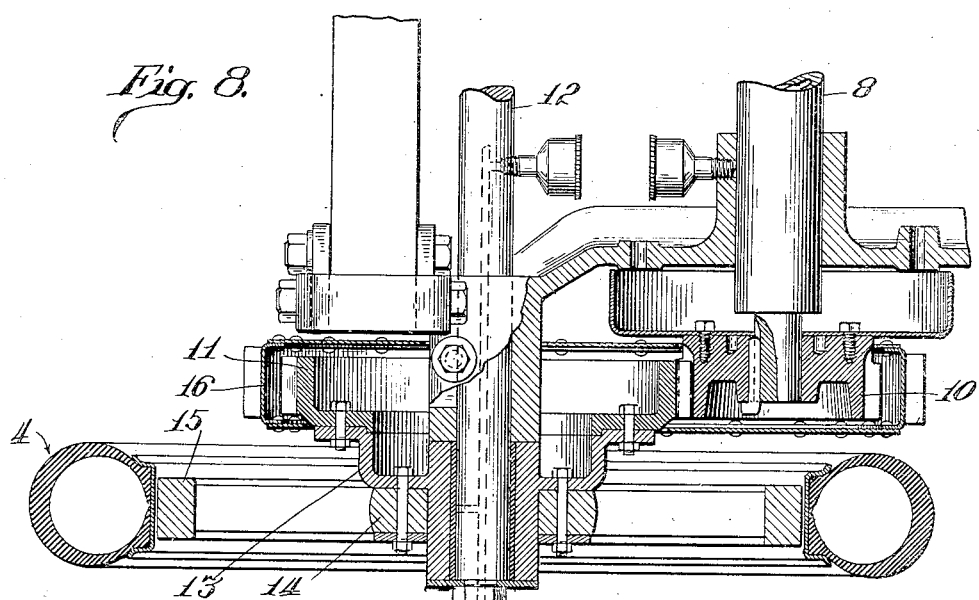
Fig. 8 is a section through the drive wheel and gearing therefor.

In order to facilitate the conversion of the drive of an ordinary truck into a drive for a machine of the character of this invention it is desirable to reverse the direction of travel of the ordinary truck. This conversion is accomplished in the present machine by removing the ordinary rear wheels (not shown) from the divided driven shaft which may receive its movement through a suitable gearing from the motor shaft 9, Fig. 3, and to place at the ends of the sections 8 of the divided shaft pinions 10. These pinions engage larger gears 11 which are loosely mounted on the additional rear axle 12 of the vehicle, whereby obviously these gears 11 are driven in a direction oppositely to that in which the rear axle sections 8 are rotated. The gears 11 (Fig. 8) are rigidly connected through a suitable hub casting 13, with the hubs 14 of the drive wheels 15 of the ordinary pneumatic or any desired construction. The pinions 10 and the gear wheels 11 may be enclosed in a gear casing 16 as indicated in Fig. 3.

The wheels 15 of the truck may therefore be driven differentially in exactly the same way as the ordinary drive wheels of a truck but their direction of rotation is reversed as compared with the ordinary wheels. From the drawings, especially Fig. 3 it is also apparent that the main load of the truck due to the charge in the box to be described, rests immediately above the actual rear axle 12; this is of great advantage, as thereby the auxiliary driving shaft 8 and the casing 8' is largely relieved of the strain which otherwise would be imposed on the same, the load carrying strain being mainly absorbed by the axle 12.

A bracket structure 17 rising from the rear end of the chassis 1 serves for supporting a casing or box 18 into which the materials to be scooped up by the shovel are to be delivered, and from which they may be discharged, after having been properly mixed.

The box 18 has a vertical rear wall 21 and a slanting bottom 22, to facilitate automatic discharge. The front wall of this box, as indicated at 19, is preferably curved, and a number of adjustable diaphragms or partition walls are located between the side walls 23 of the box. The arrangement of the partition walls is shown in detail in Fig. 11; angle irons 24, which are rigidly secured to the side walls 23, support inclined upper plates 25 to which lower plates 26 and 27 respectively are pivotally secured. These hinged plates, the plate 26 being shown curved and the plate 27 straight, extend downwardly into the interior of the box and carry lugs 28 in the form of angle irons through which a bolt 29 or the like passes for securing the respective diaphragm selectively in any one of several positions within the box the latter having openings 30 in suitable graduated alignment for this purpose. The plates 26, 27 of these diaphragms have slots 31 for receiving screws 34 of additional extension plates 32, 33 slidably secured to the plates 26 and 27 respectively. The holding screws 34 may be tightened wherever desired to lengthen or shorten the diaphragms in the box. Numerals 35, Fig 3, which are marked on the outside of the box will facilitate the angular adjustment of the diaphragms, the numerals indicating the cubic contents of the space confined by walls of the box and the diaphragms.

One of the compartments formed in this way may serve to receive sand, another compartment may receive rock or gravel, and a third compartment may receive the cement which is necessary for the manufacture of concrete. The material which is selectively dumped into the box will be collected on the bottom thereof and will be discharged upon opening of the gate 36 which is hinged at its upper edge to the front wall and which ordinarily is held in closed position by a latch described below.

A bracket 37 which is secured above the chassis and which in the present embodiment is shown to be united with the box 18 serves as a support for a rod or bar 38 from which the lateral arms 39 are pivotally suspended. These arms are offset between their ends, as shown at 40, and their front parts are riveted at 41 to the side walls 42 of a conveying element scoop or shovel 43. The shovel comprises a bottom wall 44, Fig. 10, which terminates in a plurality of pointed shoes 44' to facilitate the entry of this element into the heap of material on the ground. A cover 45 is supported by the side walls but does not extend over the front part of the bottom plate, thereby leaving a relatively large opening into which the material may be forced when the scoop is driven into the heap. This opening constitutes the charging end of the shovel, while the discharge end at the opposite side normally is closed through a cover blade or gate 46 which is slightly curved and which extends between the bottom and top walls of the shovel.

This cover or closing blade is provided with angular offset arms 48 preferably located at the outer surface of the walls 42 and pivoted at their ends to the rear part of the arms 39, fixedly secured to the shovel. The closing blade 46 normally is forced into the position shown in Fig. 10 by its own weight and is retained in this position until it is forcibly lifted from the closing position to discharge the material into one of the compartments of the box selected for this purpose.

A cam plate 50 is movably mounted on at least one of the side walls 23 of the box 18 and controls certain parts movably or fixedly secured to the scoop 43, for effecting the opening of the blade to pour the material into the selected compartment. A bracket 51 secured to the side wall of the box, Fig. 12, carries a pivot pin 52 on which the cam 50 may turn. One portion of the cam is flexibly connected through the rod 53 with a link 54 which is rotatably mounted on a stationary quadrant 55 secured to a bracket on the box. The pin 56 on which the link 54 is fixed is also rigidly connected with a hand lever 57 associated with a locking means of known construction which normally is forced into engagement with the edge of the quadrant and which may upon adjustment of the lever enter any of the notches 58 provided in this quadrant, to maintain the link and thereby the cam 50 in a selectively determined position. A yielding release is also associated in a known way with the lever 57, and may serve for withdrawing the locking means from its engagement.

Figure 2:
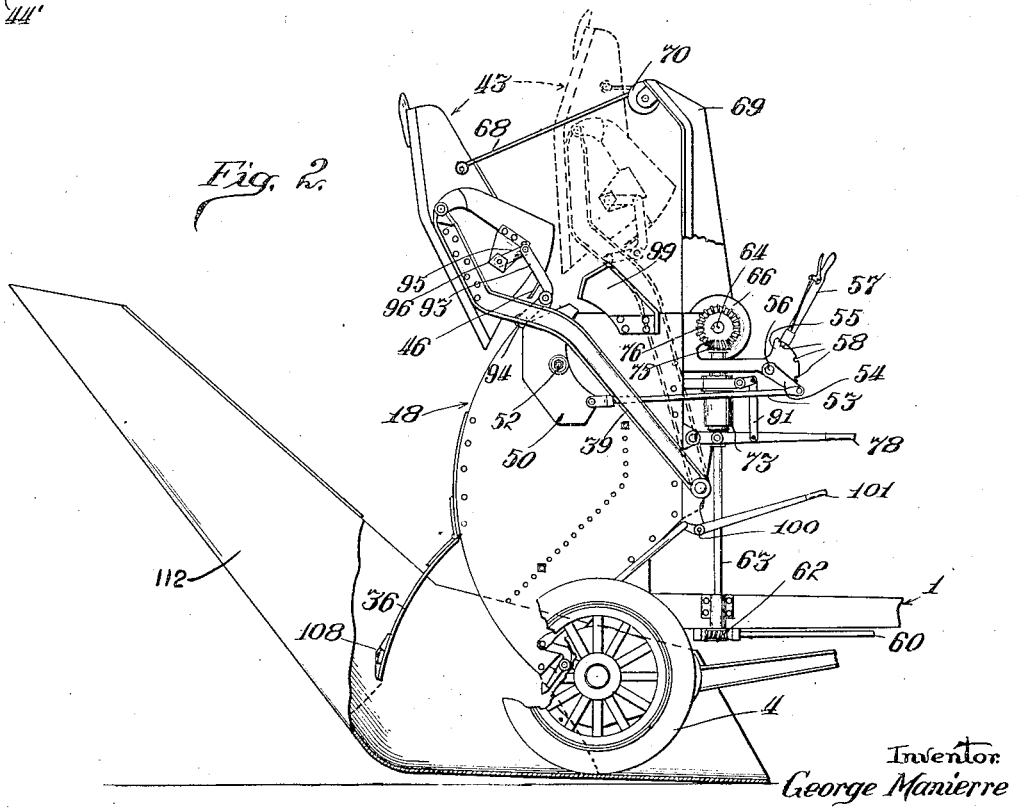
Fig. 2 is a side elevation of the rear part of the machine showing the shovel raised, and the compartment open for discharge into a conveyor scoop of a concrete machine.

Figs. 1 and 2 show this quadrant 55 with three notches 58 thereby permitting the cam 50 to be locked in three different positions, in two of which the opening of the scoop 43 is effected by the cam to discharge into predetermined compartments of the box 18, while in a third adjustment of the cam 50, the controlling elements on the scoop will pass this cam without being opened thereby.

For actuating the hoisting device to raise the scoop from the position shown in Fig. 1 to a discharge position, for instance indicated in Fig. 2, the prime mover of the entire truck may be used. A longitudinal secondary drive shaft 60 is suitably supported in the chassis 1 of the truck and receives its rotary movement through a sprocket chain drive 61 located at one end of the same. The other end of the shaft carries a worm, not shown, in engagement with a worm wheel 62 at the foot of a vertical shaft 63 which is suitably supported in bearings on the frame 1 or box 18 of the machine. The shaft 63 actuates a transverse shaft 64 which is supported in bracket bearings 65 near the top end of the box 18 and on which two drums 66 are rigidly secured. Tension members 67 in the form of wire ropes, cables or the like, are at one end attached to said drums 66 respectively, while the other end of each of said ropes or cables is secured at 68 to the side walls 42 of the scoop. A substantially triangular frame structure 69 rises from the top of the box and carries at the upper end sheaves or pulleys 70 over which the tension members 67 are guided. It is obvious therefore that upon rotation of the shaft 64 in a predetermined direction the scoop 43 may be raised, owing to the winding of the cables 67 on the pertaining drums 66 and that during this hoisting movement the path of the scoop as a whole is an arc of a circle, having its center in the axis of the pivot owing to the rigid connection of the scoop with the arms 39.

This hoisting mechanism, however, is under control of the operator who may take his position on the platform of the chassis 1. The shaft 63 Fig. 4 carries in its upper portion a plurality of discs 71 which are keyed thereto and which are separated from each other through interposed friction elements or plates 72 which are not keyed to the shaft but which are feathered or keyed to a vertical drum 73 which is loosely rotatable about the top of the shaft 63 and which is rigidly connected, with a short shaft 74 supported in alignment with the shaft 63 above the same. The shaft 74 carries on top a bevel pinion 75 in engagement with a bevel gear 76 at the end of the transverse shaft 64. Normally the extension shaft 74 is not in driving connection with the shaft 63 as the clutch drum 73 is not driven thereby. If, however, the friction discs 72 are pressed against the discs 71 fixed on the shaft 63 these friction discs will induce the rotation of the clutch drum 73 and this rotation will be transmitted to the shaft extension 74 and from this extension through the gearing to the hoisting shaft 64.

In order to move the clutch members 72 to operative position with respect to the members 71 the shaft 63 carries a collar 77 beneath the lower-most disc 72 and slidably but not rotatably mounted on the shaft. The lever 78 is pivoted to a bracket 79 at the rear wall of the box 18 and has pins which project from a bifurcated portion 80 of the lever into a circular groove 81 of the collar 77. Upon raising the lever 78 the collar 77 therefore will be shifted upwardly to compress the friction discs 72 and to bring them into operative engagement with the other discs 71 whereby the clutch drum 73 will be rotated. If the operator releases the lever 78 the latter will drop by its own weight and will carry the clutch collar 77 to inoperative position, thereby interrupting immediately the actuation of the hoisting device.

In order to prevent a sudden downward movement of the scoop 43 after its discharge, or whenever the clutch is released after the scoop has been raised a brake is provided in connection with the drive shaft and its extension 74. This brake, as illustrated in Figs. 4 and 5, includes a brake disc 82 which in the embodiment illustrated, is integral with the clutch drum 73 and which therefore rotates with the shaft 74. A bracket 83 secured to the wall of the box 18 serves for supporting a ring structure 84 having open end portions 85 through which a transverse pin 86 extends. A brake lining 87 of leather or some other suitable friction material, is interposed between the ring and the brake disc 82. The pin 86 has secured, near the end portions, wedge-shaped cam rings 88. Cooperating cam rings 89 form the terminals of the bifurcated portion of a brake lever 91 which is pivoted on the pin 86 and which is loosely connected with the lever 78 which controls the clutch. This flexible connection between the two control members 78 and 91 is selected so that upon actuation of the clutch the brake is automatically released, thereby facilitating the rotation of the clutch drum and the actuation of the hoisting device. If, however, the clutch lever 78 is moved (by its own weight) to a position indicated in Fig. 4 in which the clutch itself is inoperative, the lever 91 will also turn the cams 89 into such position relative to the companion cam members 88 that the brake ring 84 is contracted and the brake lining 87 is frictionally applied to the brake drum 82. If the scoop, therefore, should return by its own weight to charging position, this return will be a gradual movement only, the shafts 64 and 74 now being rotated in opposite direction, which also causes the drum 73 to turn in a direction opposite to that in which shaft 63 rotates.

Figure 6:
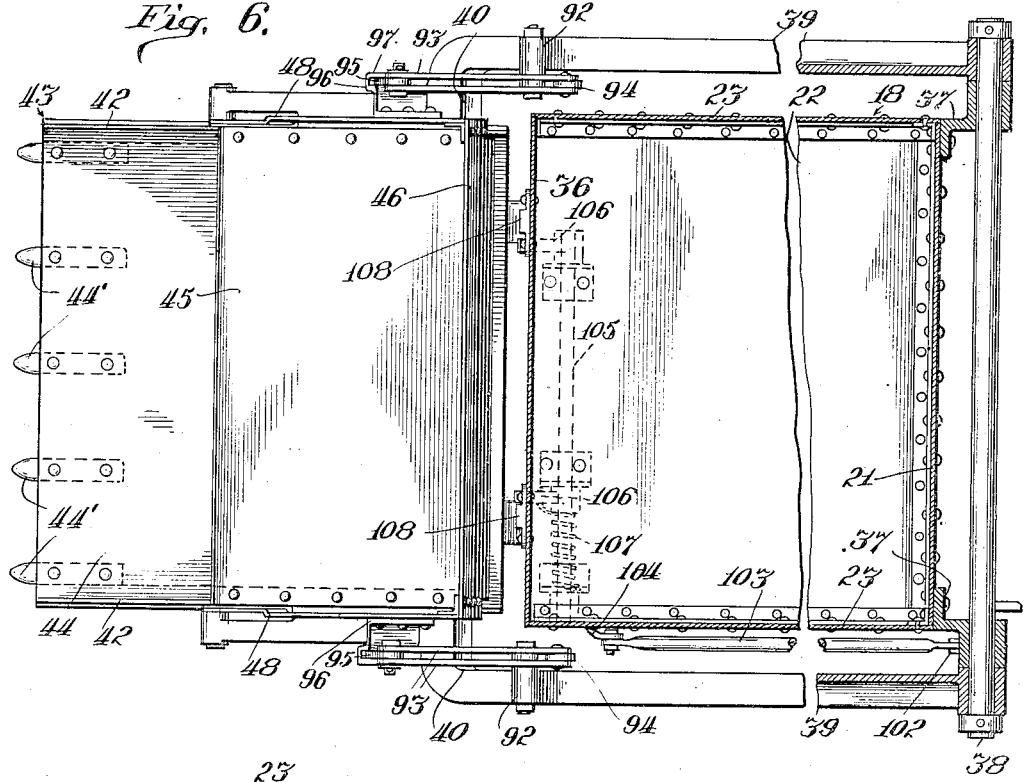
Fig. 6 is a top plan view of the scoop or shovel and a horizontal sectional view of the compartment which receives the material.
Figures 9, 10:
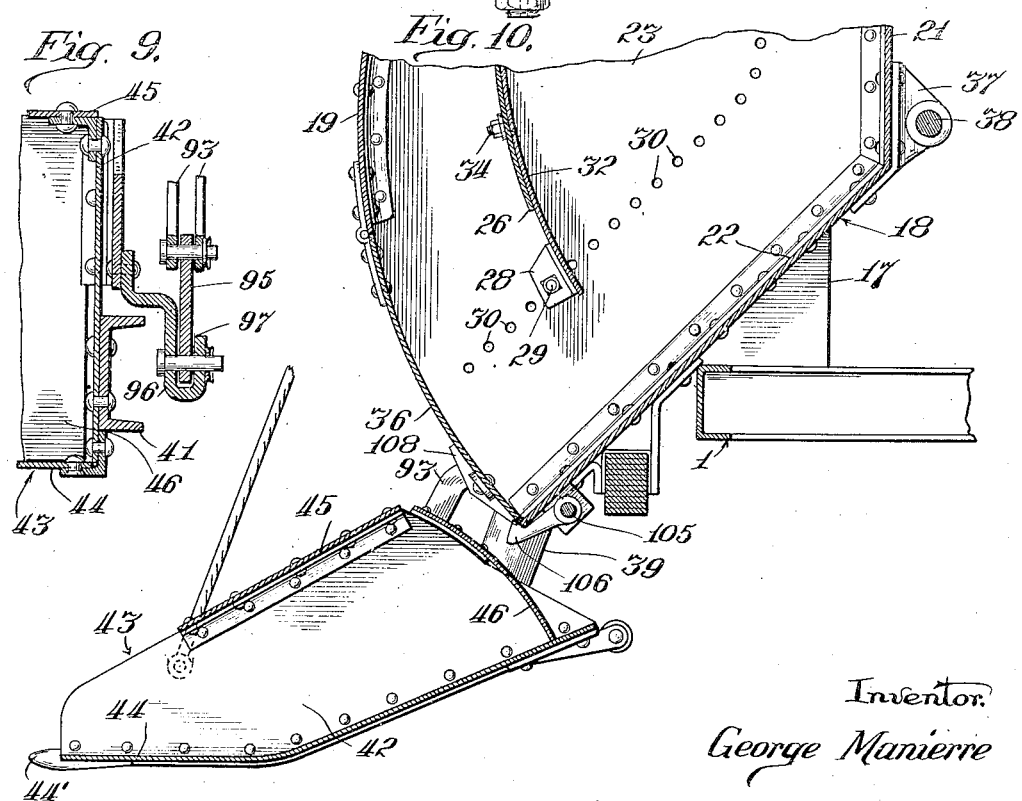
Fig. 9 is a detail sectional view of the automatic device for opening and closing the scoop.
Fig. 10 is a sectional elevation through the rear part of the box and the scoop.

The automatic control of the gate or cover 46 of the scoop under the influence of the adjusted cam 50 is effected in the embodiment shown in the following way: Brackets 92, which project from each of the arms 39, serve for pivotally supporting an angle lever 93, Fig. 3, terminating at one end in a roller 94 which is adapted to coact with the edge portions of the cam 50, (when the scoop is hoisted), while the other end of each lever 93 is in flexible connection with the respective arm 48, attached to the gate 46 by a link 95. This link is pivotally secured at one end to the lever 93 and secured at its other end to a bracket 96 which is fastened to the arm 48. It will be seen, therefore, that the position of the lever 93 will control the position of the arms 48 and the gate 46 with respect to the scoop or shovel 43. Fig. 9 shows the bell crank lever 93 as being composed of two members between which the link 95 is pivotally mounted, the other end of the link entering a channel which is formed in the bracket 96 by a lip or tongue 97 bent from the end portion of the bracket upwardly and parallel to the side wall of the scoop. The toggle joint constructed in this way and comprising the members 93 and 95 is very freely movable and at the same time is securely guided to prevent dislocation of the parts of which it is formed. The roller 94, as will be seen from Fig. 6, is carried between the two parallel portions of the angle lever 93 in a way similar to the attachment of the link 95 so as to maintain these two portions in permanent parallel arrangement. This will also assure the maintenance of that distance between the roller 94 and the side walls 23 of the box 18 which is necessary to cause the contact of the roller 94 with the edge of the cam 50.

The outline of the cam 50 is selected so that the roller 94 upon contacting therewith will cause the opening of the lid or gate 46 a short time before the delivery edge at the rear of the bottom 44 of the shovel is in exact opposition to that opening of the box into which the charge of the shovel is to be dumped. The gate, however, will entirely open when the scoop has gone through its pivotal movement, to the extent desired, so that the material then flows very freely and rapidly from the shovel into the box. At no adjustment of the cam 50, however, the gate 46 is opened so far away from the point of delivery that a portion of the material carried by the scoop could be dumped into any of the compartments to which it is not intended to be delivered. In other words when the gate is released to permit the delivery of the material into the lowermost compartment, the gate will partly overlie the inlet opening of the next higher compartment and thereby form a closure for this next compartment, preventing thereby the discharge of one class of material into a compartment intended for another class. When the scoop, carried upward by the hoisting device, continues its movement completely across the selected opening in the box, the gate will remain stationary with respect to the shovel. The opening of the shovel therefore depends exclusively upon the adjustment of the cam 50 and the operator does not have to exert any skill for dumping the contents into the compartment intended therefor.

When the cam is moved to neutral position, so as not to influence the roller 94, the gate will be held in closed position until the scoop is lifted high enough to strike with the roller a stationary cam or kick-off 99 which is on top of the box and which causes the material, cement or the like, to be dumped into the last compartment of the box near the rear wall of the same.

The sand, stone and cement having been deposited in the various compartments of the box and having been collected on the bottom of the box 18 may then be discharged in mixed condition when the gate 36 is opened. The opening mechanism for the gate is also under control of the operator and comprises according to Fig. 3 a transverse shaft or bar 100 on which the hand lever 101 is rigidly secured. An arm 102 also fixed to the transverse shaft 100 is in flexible connection with a link 103, the other end of which is pivotally attached to an angular arm 104 on a transverse pin or shaft 105. The latter is oscillatably mounted in bearings secured to the bottom wall of the box 18 and is equipped with a plurality of hooks or latches 106, as shown in Fig. 10. A helical spring 107 surrounds a portion of a shaft and has one end connected with the shaft, while the other end is secured to a bearing of the same. This spring therefore has a tendency to rotate the shaft 105 and the hooks 106 secured thereto, into a predetermined position, namely into a position in which the hooks will hold the lower edge of the gate 36 closed, as shown in Fig. 10. The gate 36 which upon discharge will occupy the position indicated in Fig. 2 may, afterwards be returned to closed position by the lowering movement of the scoop 43. This gate carries lugs 108 which are wedge shaped and which will be contacted by the delivery edge of the scoop 43 when the latter is lowered from the position shown in Fig. 2 to the position shown in Fig. 1. The hooks will permit the edge of the bottom 44 to travel past the same, and when the scoop has forced the gate 36 into closing position (Fig. 10) the hooks 106 will immediately snap back, thereby locking the gate 36 against release even after the scoop has passed beyond the wedge shaped lugs 108.

Figure 7:
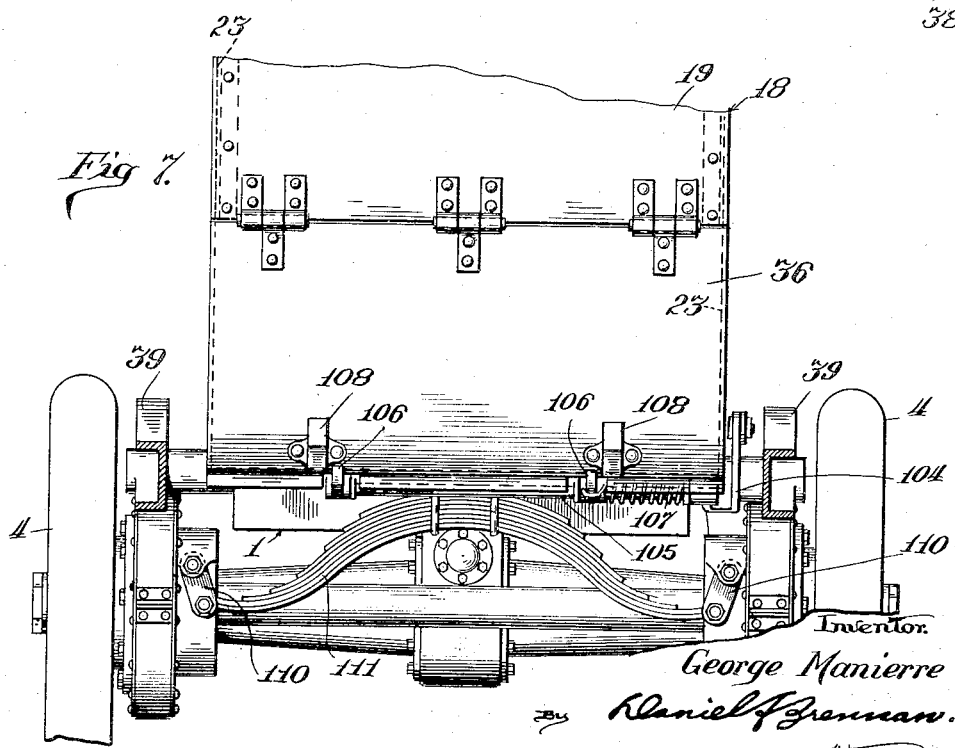
Fig. 7 is a rear elevation and partly section on line 7—7 of Fig. 3.

The structure for supporting the load box may be selected as desired. Fig. 7 indicates that brackets supported on the chassis carry links 110 which are connected to the ordinary transverse spring 111 on which the box 18 rests. Any other construction, however, may be used in place of this support.

The operation of the device will be apparent from the above description. When it is desired to use the truck for conveying a batch of material to a concrete mixer and to proportion the ingredients of the batch in accordance with the requirements specified, the diaphragms 26 and 27 in the box 18, are primarily adjusted through a release of the holding bolts 29 and fixing the same in the new position. The machine is then advanced to the heaps of the various materials and after driving the scoop into each heap the operation of raising it to the discharge position, and of again lowering it, is repeated until the desired quantity of material has been deposited in the selected compartment. This operation is carried out for each of the materials and compartments, and then the entire machine may be directed into the lower end of a shoe 112 Fig. 2 of a concrete mixer. The lever 101 is then moved to release the gate 36 and the batch preliminarily mixed, is dumped into the lower end of this shoe. The emptied machine is then withdrawn from the shoe and the operations can be begun again.

For road work the machine is extremely useful in picking up ballast or gravel from the road bed or from a heap of this material and dumping it on another place of the road bed. The machine is much lighter than other machines serving the same purpose, and owing to this lightness the danger of injuring the road on which the material is stored is avoided. The necessity of putting down tracks is eliminated; the machine is light and flexible enough to advance to all parts of the road bed and to proceed everywhere under its own power at relatively large speed. It is obvious that the machine can also be used as a tractor for pulling other road utensils, mixers, concrete machines, or the like, and that its capacity can be increased to satisfy all practical requirements.

I claim:—

1. In combination with a truck a load carrying box having several compartments mounted on the truck, a load conveying element mounted on the truck and adapted to discharge into said box, the box being provided with a cam portion, and means on the conveying element cooperating with the cam portion on the box for positively enforcing discharge of the contents of the load conveying element into the several compartments of the box.

2. In a truck the combination of a load carrying box having several compartments, an element for conveying the load to the box, mechanism for actuating said conveying element and means adjustable on the box for selectively dumping the contents of the conveying element into the compartments of the box.

3. In a truck the combination of a load carrying box, a load conveying element provided with openings at both ends and adapted to be filled from one of said ends the opposite end of the element having a movable cover, means for moving said element from charging position to discharge position and positively acting means on the box cooperating with the conveying element for turning the conveying element to dumping position and for removing the cover to discharge the contents thereof from the opposite end of said element.

4. In a truck, the combination of a load carrying box, a load conveying element, the box having a plurality of compartments, means for actuating the conveying element to discharge position with respect to the box, and manually adjustable means on the box for selectively effecting the discharge of the contents of the conveying element into any one of said compartments after the conveying element has arrived at dumping position with respect to the selected compartment.

5. In a truck the combination of a load carrying box having several compartments each provided with a charge opening, an engine, means driven by the engine for conveying a charge to the box, means for selectively determining the compartment to be charged, and means for preventing entrance of a charge into a compartment adjacent the compartment selectively determined for the charge.

6. In a truck the combination of a load carrying box having several compartments a load conveying element, means for actuating said load conveying element means for discharging the contents of the conveying element selectively into any one of the compartments, and means on the load conveying element for covering the compartment adjacent to that into which the load is being discharged.

7. In a truck the combination of a load carrying box, a scoop having a closure member, means for moving the scoop from charge receiving position to dumping position with respect to the box, and means for raising the closure member with respect to the scoop when the latter has arrived in dumping position.

8. In a truck the combination of a load carrying box, a scoop for conveying the load into said box, actuating means for said scoop, a closure member for said scoop, and automatic means for moving said closure member with respect to said scoop to permit the discharge of the material from the scoop through the opening previously closed by the closure member, without forcing said material to travel in its discharge over said closure member.

9. In a truck the combination of a load carrying box having a charge opening, a scoop adapted to convey the load into the box, means on the truck for actuating said scoop, a closure member for said element, and means for moving said closure member upon approach of said element to the charge opening of the box.

10. In a truck the combination of a load carrying box having a charge opening, a load conveying element actuating means for said load conveying element, a closure member for said conveying element, and adjustable means for automatically moving said closure member to release position when the conveying element approaches the charge opening of the box.

11. In a truck the combination of a load carrying box, an element for conveying the load into the box, actuating means for said element, a closure member for said element, and means mounted on the box for releasing said closure member to permit of the discharge from said conveying element into the box.

12. In a truck the combination of a load carrying box, an element for conveying the load into the box, actuating means for said element, a closure member for said element, adjustable means for releasing the closure member at a predetermined point in the path of said conveying element, and a lock for retaining said releasing means in adjusted position.

13. In a truck the combination of a load carrying box, a frame on which said load carrying box is mounted, said frame being adapted to support the operator of the truck, an element for conveying the load into the box, actuating means for said load conveying element, and means controllable from the operator's position for effecting the discharge from said conveying element into the box at a predetermined point in the path of said conveying element.

14. In a truck the combination of a load carrying box, a load conveying element, a closure member for said load conveying element, a movable support structure for said conveying element, means on the truck for moving the conveying element from charge receiving to dumping position and mechanism carried by the supporting structure for positively effecting the release of said closure member from operative position.

15. In a truck the combination of a load carrying box, a scoop, a gate pivotally mounted on the scoop, means for conveying the scoop from charge position into discharge position with respect to the box, and means on the box for imparting a swinging movement to said gate when the scoop has reached a selectively predetermined point in its movement.

16. In a truck the combination of a load carrying box, a scoop, a pivotal supporting structure for the scoop, a gate for the scoop a lever mounted on said structure and movably connected with the gate, means on the box for moving said lever with respect to the scoop, and means for swinging the structure about its pivot.

17. In a truck the combination of a load carrying box, a scoop, a gate on the scoop, a pivotal supporting structure for the scoop, a lever fulcrumed on the supporting structure, a link connecting said lever with the gate, a cam mounted on the box, and a roller carried by the lever adapted to engage the cam when the scoop is being moved.

18. In a truck the combination of a load carrying box, a cam carried thereby, a scoop, a gate on the scoop, an oscillatable supporting structure for the scoop, a lever on the structure connected with the gate, and means on the lever adapted to engage the cam for moving the gate with respect to the scoop at a predetermined point of the movement of the same.

19. In a truck the combination of a load carrying box, a cam mounted thereon, a scoop carried by the truck, a gate on the scoop, levers connected with the gate and adapted to open the gate upon engaging the cam, and means on the truck for moving the scoop to discharge position with respect to the box.

20. In a truck the combination of a load carrying box, an engine, a scoop, engine controlled means for moving the scoop to discharge position with respect to the box, a gate on the scoop, and means for moving the gate to discharge position with respect to the scoop upon movement of the scoop to discharge position with respect to the box.

21. In a truck the combination of a load carrying box, having several compartments, an engine, a scoop, means controlled by the engine for moving the scoop to discharge position with respect to the box, a gate on the scoop, a cam on the box and means on the gate controlled by the cam for effecting the discharge of the contents of the scoop into a predetermined compartment of the box.

22. In a self-loading and mixing truck, a load carrying box provided with a plurality of separated compartments, several of said compartments communicating with a common space within the box, means on the truck for individually charging the compartments and means for collectively discharging the compartments.

23. A self-loading truck including a load carrying box, a closable gate secured to the box, a movable charge element for the box, said gate being adapted to move automatically into opening position upon release, and obstructing in said position the path of said element.

24. A self-loading truck including a load carrying box, an element for conveying a load into the box, a gate secured to the box, and means connected with the conveying element for moving the gate.

25. A self-loading truck including a load carrying box, an element for conveying a load into the box, a gate for the box, and mechanical means for releasing and locking the gate, the conveying element being adapted to effect the closure of the gate.

26. In a self-loading truck a load carrying box, an engine, a gate for the box, a charge conveying element controlled by the engine, said element being adapted to effect a closure of the gate upon movement to charge receiving position.

27. A self-loading truck, including a load carrying box, a charging element for the same, a gate on said box, the charge element being adapted to move the gate to closing position, and means for locking the gate in closed position after it has been moved into said position by the charge element.

28. A self-loading truck including a load carrying box, a gate for the same, a charging element for the box adapted to move the gate to closing position when traveling in a certain direction, means for locking the gate in closed position, and manually controlled means for releasing the gate from locked position.

29. A self-loading truck including a load carrying box, an operator's platform, a charging element for the box, a gate on the box, means controlled by the charging element for locking the gate, and manually controlled means operable from the platform for releasing the locking means.

30. A self-loading truck including a load carrying box, means for charging the box, said means being movable in a predetermined path, while in operation, and a gate hinged at its upper edge to a wall of the box, and projecting when released into the path of said charging means.

31. A self-loading truck including a load carrying box, engine controlled means for charging the box, a gate hinged at its upper edge to a wall of the box, and under control of said charging means so as to be closed thereby, and locking means engaging the lower edge of the gate for retaining the same in closed position.

In testimony whereof, I affix my signature in the presence of two witnesses at 85 Oneida St., Milwaukee, Wisconsin.

GEORGE MANIERRE.

Witnesses:
JULIA M. BURNS,
HENRY MITTELSTRASS.